United States Patent
Gao et al.

(10) Patent No.: US 12,373,104 B2
(45) Date of Patent: Jul. 29, 2025

(54) METHOD AND DEVICE FOR DATA STORAGE

(71) Applicant: SAMSUNG ELECTRONICS CO., LTD., Suwon-si (KR)

(72) Inventors: Kuan Gao, XiAn (CN); Yuanyi Zhang, XiAn (CN); Kaige Ma, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/105,000

(22) Filed: Feb. 2, 2023

(65) Prior Publication Data

US 2023/0409200 A1 Dec. 21, 2023

(30) Foreign Application Priority Data

Jun. 15, 2022 (CN) .......................... 202210677987.5

(51) Int. Cl.
*G06F 12/00* (2006.01)
*G06F 3/06* (2006.01)

(52) U.S. Cl.
CPC .......... *G06F 3/0611* (2013.01); *G06F 3/0643* (2013.01); *G06F 3/067* (2013.01)

(58) Field of Classification Search
CPC .... G06F 3/0613; G06F 3/0653; G06F 3/0659; G06F 3/0683

(Continued)

(56) References Cited

U.S. PATENT DOCUMENTS 10,282,324 B2   5/2019   Bhimani et al.
11,182,101 B2   11/2021  Bazarsky et al.
(Continued)

FOREIGN PATENT DOCUMENTS

| CN | 110554999 A | 12/2019 |
| CN | 111984602 A | 11/2020 |
| CN | 113608867 A | 11/2021 |

OTHER PUBLICATIONS

Changman Lee et al., "F2FS: A New File System for Flash Storage," Proceedings of the 13th USENIX Conference on File and Storage Technologies www.usenix.org/conference/fast15/technical-sessions/presentation/lee, 2015 (15 total pages).

(Continued)

*Primary Examiner* — Mohamed M Gebril
(74) *Attorney, Agent, or Firm* — Sughrue Mion, PLLC

(57) ABSTRACT

A method and device for data storage are provided. The method includes determining, based on a write message corresponding to a first file, an application corresponding to the first file, a file type of the first file, and first attribute information corresponding to the file type, the first attribute information corresponding to the file type obtained based on second attribute information corresponding to all files of the file type on which the write operation processing have been performed in response to the respective write messages of the application, predicting a stream identification information corresponding to the first file by using a file classifier based on the application corresponding to the first file, the file type of the first file and the first attribute information corresponding to the file type, and sending a writing command carrying the stream identification information to a storage device.

20 Claims, 11 Drawing Sheets

(58) Field of Classification Search
USPC .......................................................... 711/154
See application file for complete search history.

(56) References Cited

U.S. PATENT DOCUMENTS

| | | |
|---|---|---|
| 11,182,104 B2 | 11/2021 | Kim et al. |
| 12,001,885 B2 * | 6/2024 | Jeon .................... G06F 12/0246 |
| 2016/0283125 A1 | 9/2016 | Hashimoto et al. |
| 2017/0228157 A1 | 8/2017 | Yang et al. |
| 2018/0150257 A1 | 5/2018 | Griffith et al. |
| 2018/0276115 A1* | 9/2018 | Shoji .................... G06F 13/1694 |
| 2020/0150889 A1* | 5/2020 | Post ....................... G06F 3/0611 |
| 2021/0200477 A1 | 7/2021 | Seo et al. |
| 2022/0094738 A1 | 3/2022 | Zhang et al. |
| 2024/0232032 A1* | 7/2024 | Hod ....................... G06F 11/324 |

OTHER PUBLICATIONS

Jingpei Yang et al., "AutoStream: Automatic Stream Management for Multi-stream SSDs," Memory Solutions Lab, Samsung Semiconductor, www.systor_org/2017/slides/AutoStream.pdf, 2017 (13 total pages).

* cited by examiner

METHOD AND DEVICE FOR DATA STORAGE

CROSS-REFERENCE TO RELATED APPLICATION(S)

This application is based on and claims priority under 35 U.S.C. § 119 to a Chinese Patent Application No. 202210677987.5 filed on Jun. 15, 2022, in the China National Intellectual Property Administration, the disclosure of which is incorporated by reference herein in its entirety.

BACKGROUND

1. Field

The disclosure relates to data storage, and more particularly, to a method and device for data storage.

2. Description of Related Art

In data storage technology, a multi-stream mechanism allocates different stream Identifiers (IDs) to data with different lifetimes, so as to store the data in different blocks of a block storage device corresponding to the stream IDs, which may reduce Write Amplification Factor (WAF) of the block storage device, and extend the life of the block storage device.

Related art stream allocation schemes mainly include the following two kinds of: 1) Flash Friendly File System (F2FS) and 2) Auto-Stream.

When the F2FS allocates streams, the F2FS allocates three streams called hot, warm, and cold to files and metadata, respectively.

For files, the F2FS categorizes files into three categories of hot data, warm data, and cold data according to a filename extension, and each category of data corresponds to one stream. When a file cannot be categorized based on a filename extension, if the number of dirty pages written back of the file is less than a set threshold, the file is categorized into hot data, and if the file is moved by Garbage Collection (GC) thread of the F2FS, the file is categorized into cold data.

For metadata, direct nodes of directories and normal files are assigned to the same stream, indirect nodes of the directories and the normal files are assigned to another stream, and other metadata are assigned to a third stream, by the F2FS.

The stream allocation scheme applied to the F2FS belongs to a static stream allocation scheme, that is, after a stream corresponding to files of a certain file type is determined, the stream of the files of the file type will not change. However, a lifetime of a file is not only dependent on the file type, so effect of the stream allocation is not good.

When the Auto-Stream allocates streams, the Auto-Stream divides consecutive Logic Block Addresses (LBAs) into fixed-sized chunks, counts the number of writing to each chunk, and determines a stream allocated to the each chunk based on the number of the writing to the each chunk.

A granularity with which the Auto-Stream allocates streams is a chunk. If the chunk is set to be too small, too much memory will be taken up. If the chunk is set to be too large, the chunk may include a plurality of files, and if some files among the plurality of files are relatively frequently written, which leads to large number of writing to the chunk, other files infrequently written in the chunk are not allocated appropriate streams.

Therefore, how to effectively improve stream allocation effect is an urgent problem to be solved.

SUMMARY

According to one or more aspects of the disclosure, there is provided a method and device for data storage, which may store files with a same lifetime in a same block as much as possible to reduce the WAF of a block storage device.

According to an aspect of the disclosure, there is provided an method for data storage, including: determining, based on a write message corresponding to a first file, an application corresponding to the first file, a file type of the first file, and first attribute information corresponding to the file type, the first attribute information corresponding to the file type obtained based on second attribute information corresponding to all files of the file type on which the write operation processing have been performed in response to the respective write messages of the application; predicting a stream identification information corresponding to the first file by using a file classifier based on the application corresponding to the first file, the file type of the first file and the first attribute information corresponding to the file type, the file classifier being a trained machine learning model; and sending a writing command carrying the stream identification information to a storage device to cause the storage device to write the first file into a storage block corresponding to the stream identification information.

The stream identification information corresponding to the first file using the file classifier may be predicted based on whether a first period of time has elapsed from a time of launch of the application.

The method may further includes, based on a determination that the first period of time has not elapsed since the time of launch of the application, determining the stream identification information corresponding to the first file according to a stream mapping table, based on the application corresponding to the first file and the file type of the first file, wherein the stream mapping table indicates a correspondence between a plurality of applications, a plurality of file types and a plurality of stream identification information.

The method may further include recording the first attribute information corresponding to the file type and a first number of all files of the file type on which the write operation processing have been performed in response to the respective write messages of the application.

The obtaining the first attribute information of the file type may include: based on the first attribute information corresponding to the file type and the first number being recorded, updating the first attribute information corresponding to the file type and the first number according to third attribute information corresponding to the first file; and based on the first attribute information corresponding to the file type and the first number not being recorded, recording the third attribute information corresponding to the first file as the first attribute information corresponding to the file type.

The third attribute information corresponding to the first file may include a first sync count, a first sync page, a first file size and a first lifetime of the first file; and wherein the first attribute information corresponding to the file type may include a second sync count, a second sync page, a second file size and a second lifetime of the file type.

The second sync count of the file type may be an average of sync counts of all files of the file type on which the write operation processing have been performed in response to the respective write messages of the application, wherein the second sync page of the file type may be an average of sync pages of all files of the file type on which the write operation processing have been performed in response to the respective write messages of the application, wherein the second file size of the file type may be an average of file sizes of all files of the file type on which the write operation processing have been performed in response to the respective write messages of the application, and wherein the second lifetime of the file type may be an average of lifetimes of all files of the file type on which the write operation processing have been performed in response to the respective write messages of the application.

According to another aspect of the disclosure, there is provided a data storage device, including: a memory configured to store one or more instructions; and a processor configured to execute the one or more instructions to: determine, based on a write message corresponding to a first file, an application corresponding to the first file, a file type of the first file, and first attribute information corresponding to the file type, the first attribute information corresponding to the file type being obtained based on second attribute information corresponding to all files of the file type on which the write operation processing have been performed in response to the respective write messages of the application; predict a stream identification information corresponding to the first file by using a file classifier based on the application corresponding to the first file, the file type of the first file and the first attribute information corresponding to the file type, the file classifier being a trained machine learning model; and send a writing command carrying the stream identification information to a storage device to cause the storage device to write the first file into a storage block corresponding to the stream identification information.

The stream identification information corresponding to the first file using the file classifier may be predicted based on whether a first period of time has elapsed from a time of launch of the application.

The processor of the data storage device may further be configured to: based on a determination that the first period of time has not elapsed since the time of launch of the application, determine the stream identification information corresponding to the first file according to a stream mapping table, based on the application corresponding to the first file and the file type of the first file, and the stream mapping table indicates a correspondence between a plurality of applications, a plurality of file types and a plurality of stream identification information.

The processor of the data storage device is further configured to execute the instruction to record the first attribute information corresponding to the file type and a first number of all files of the file type on which the write operation processing have been performed in response to the respective write messages of the application.

To obtain the first attribute information of the file type, the processor of the data storage device is configured to: based on the first attribute information corresponding to the file type and the first number being recorded, update the first attribute information corresponding to the file type and the first number according to third attribute information corresponding to the first file; and based on the first attribute information corresponding to the file type and the first number not being recorded, record the third attribute information corresponding to the first file as the first attribute information corresponding to the file type.

The third attribute information corresponding to the first file may include a first sync count, a first sync page, a first file size and a first lifetime of the first file; and wherein the first attribute information corresponding to the file type may include a second sync count, a second sync page, a second file size and a second lifetime of the file type.

The second sync count of the file type may be an average of sync counts of all files of the file type on which the write operation processing have been performed in response to the respective write messages of the application, wherein the second sync page of the file type may be an average of sync pages of all files of the file type on which the write operation processing have been performed in response to the respective write messages of the application, wherein the second file size of the file type may be an average of file sizes of all files of the file type on which the write operation processing have been performed in response to the respective write messages of the application, and wherein the second lifetime of the file type may be an average of lifetimes of all files of the file type on which the write operation processing have been performed in response to the respective write messages of the application.

According to another aspect of the disclosure, there is provided system to which a storage device is applied, comprising: a main processor; a memory; and a storage device, wherein the memory is configured to store one or more instructions; and wherein in the main processor is configured to execute the one or more instructions to: determine, based on a write message corresponding to a first file, an application corresponding to the first file, a file type of the first file, and first attribute information corresponding to the file type, the first attribute information corresponding to the file type being obtained based on second attribute information corresponding to all files of the file type on which the write operation processing have been performed in response to the respective write messages of the application; predict a stream identification information corresponding to the first file by using a file classifier based on the application corresponding to the first file, the file type of the first file and the first attribute information corresponding to the file type, the file classifier being a trained machine learning model; and send a writing command carrying the stream identification information to the storage device to cause the storage device to write the first file into a storage block corresponding to the stream identification information.

The stream identification information corresponding to the first file using the file classifier may be predicted based on whether a first period of time has elapsed from a time of launch of the application.

The main processor of the system may further be configured to, based on a determination that the first period of time has not elapsed since the time of launch of the application, determine the stream identification information corresponding to the first file according to a stream mapping table, based on the application corresponding to the first file and the file type of the first file, and the stream mapping table indicates a correspondence between a plurality of applications, a plurality of file types and a plurality of stream identification information.

The main processor of the system is further configured to execute the instruction to record the first attribute information corresponding to the file type and a first number of all files of the file type on which the write operation processing have been performed in response to the respective write messages of the application.

To obtain the first attribute information of the file type, the main processor of the system is configured to: based on the first attribute information corresponding to the file type and the first number being recorded, update the first attribute information corresponding to the file type and the first number according to third attribute information corresponding to the first file; and based on the first attribute information corresponding to the file type and the first number not being recorded, record the third attribute information corresponding to the first file as the first attribute information corresponding to the file type.

The third attribute information corresponding to the first file may include a first sync count, a first sync page, a first file size and a first lifetime of the first file; and wherein the first attribute information corresponding to the file type may include a second sync count, a second sync page, a second file size and a second lifetime of the file type, the second sync count of the file type may be an average of sync counts of all files of the file type on which the write operation processing have been performed in response to the respective write messages of the application, wherein the second sync page of the file type may be an average of sync pages of all files of the file type on which the write operation processing have been performed in response to the respective write messages of the application, wherein the second file size of the file type may be an average of file sizes of all files of the file type on which the write operation processing have been performed in response to the respective write messages of the application, and wherein the second lifetime of the file type may be an average of lifetimes of all files of the file type on which the write operation processing have been performed in response to the respective write messages of the application.

BRIEF DESCRIPTION OF DRAWINGS

The above and other purposes and features of the exemplary embodiments of the disclosure will become more clear through the following descriptions made in conjunction with the figures schematically illustrating the embodiments, in which.

DETAILED DESCRIPTION

Figure 1A:
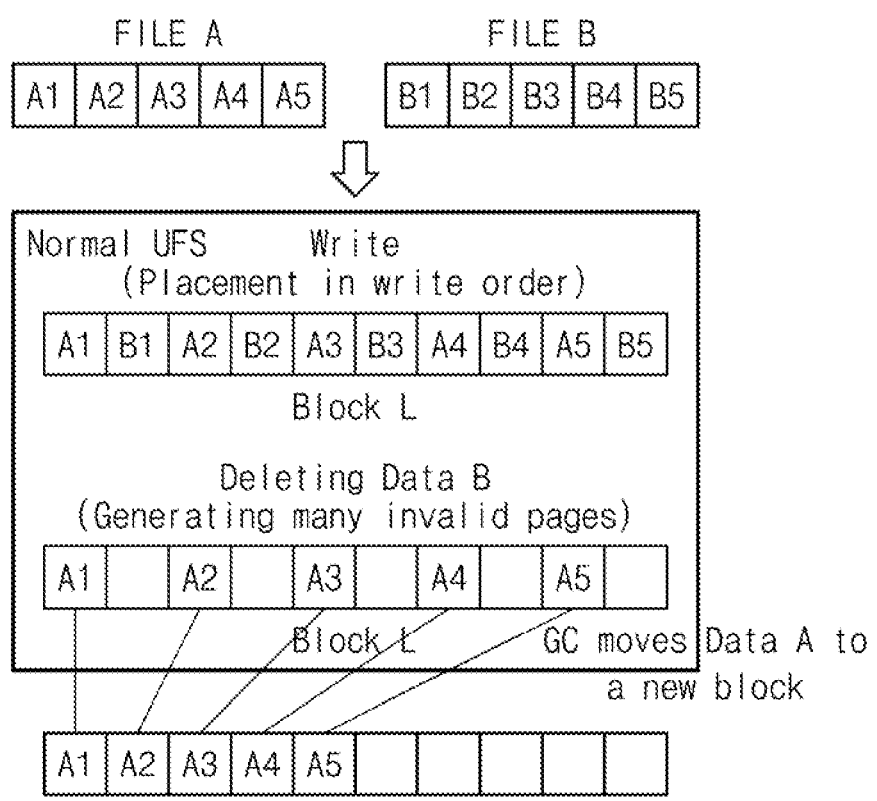
FIGS. 1A and 1B illustrate a schematic diagram of two data write schemes.

Hereinafter, various embodiments of the disclosure are described with reference to the accompanying drawings, in which like reference numerals are used to depict the same or similar elements, features, and structures. However, the disclosure is not intended to be limited by the various embodiments described herein to a specific embodiment and it is intended that the disclosure covers all modifications, equivalents, and/or alternatives of the disclosure, provided they come within the scope of the appended claims and their equivalents. The terms and words used in the following description and claims are not limited to their dictionary meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms include plural forms, unless the context clearly dictates otherwise. The terms "include," "comprise," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various embodiments of the disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the disclosure are not intended to be interpreted as excluding embodiments of the disclosure.

For a better understanding of the disclosure, the multi-stream storage mechanism is described with reference to FIGS. 1A and 1B.

Figure 1B:
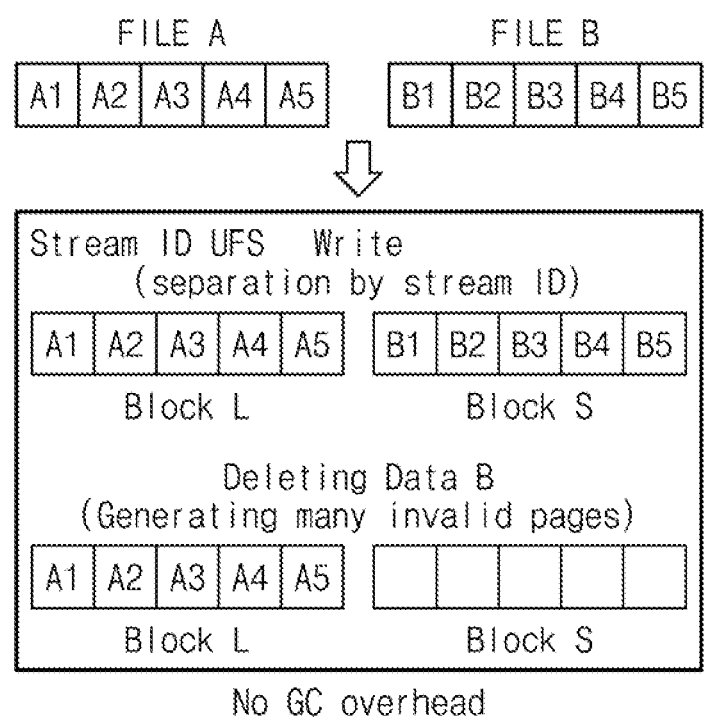

FIGS. 1A and 1B illustrate a schematic diagram of two data write schemes.

As shown in FIGS. 1A and 1B, a file A and a file B are two files with close write times.

As the non-stream allocation writing scheme shown in FIG. 1A, the file A and the file B are written to the same block (e.g., block L) of a block storage device with a high probability based on a time sequence. A writing unit of the block storage device is a page, and a minimum erasing unit is a block. If a storage time of the file A in block L is much longer than a storage time of the file B in block L, in a case that the file B is to be deleted and the file A is not deleted, the file A is moved from block L to another block firstly, and then the block L is erased when performing Garbage Collection (GC), which causes a larger WAF, thereby affecting the lifetime of the block storage device.

According to the principle of the multi-stream writing scheme shown in FIG. 1B, corresponding streams are allocated to the file A and the file B according to a file lifetime, and thus the file A and the file B with different lifetimes are allocated to different blocks (e.g., block L and block S). When the file B is deleted, it is highly possible that the files stored in block S with a similar lifetime need to be deleted, or the number of the files stored in block S that need to be deleted increase, which reduces the number of files moved from block S during GC and in some cases, it may even avoid moving other files from block S during GC.

As described above, the related art stream allocation scheme F2FS allocates stream IDs to files based on file types (e.g., filename extensions), and allocates different streams to different metadata based on direct nodes, indirect nodes and other metadata, without considering an actual lifetime of a file. The Auto-Stream counts the number of writing of all files in each chunk, which also causes unreasonable and low efficient stream allocation.

According to one or more aspects of the disclosure, there is provided a method and a device for data storage to more efficiently allocate data with similar lifetimes to a block corresponding to the same stream of a storage device. In this manner, the one or more aspects of the disclosure may overcome the problems with the related art data storage.

According to one or more example embodiments, a storage device that supports multiple streams provides an interface for stream allocation, a host identifies the lifetime of data and allocates corresponding stream IDs to the data of different lifetimes, the storage device receives the data corresponding to the stream IDs through the interface for stream allocation, and stores the data in blocks corresponding to the stream IDs of the storage device. According to an example embodiment, the data storage device may be a Universal Flash Storage (UFS)).

According to one or more example embodiments, method and devices for data storage described herein may be applied to any storage device that supports multiple streams.

Figure 2:
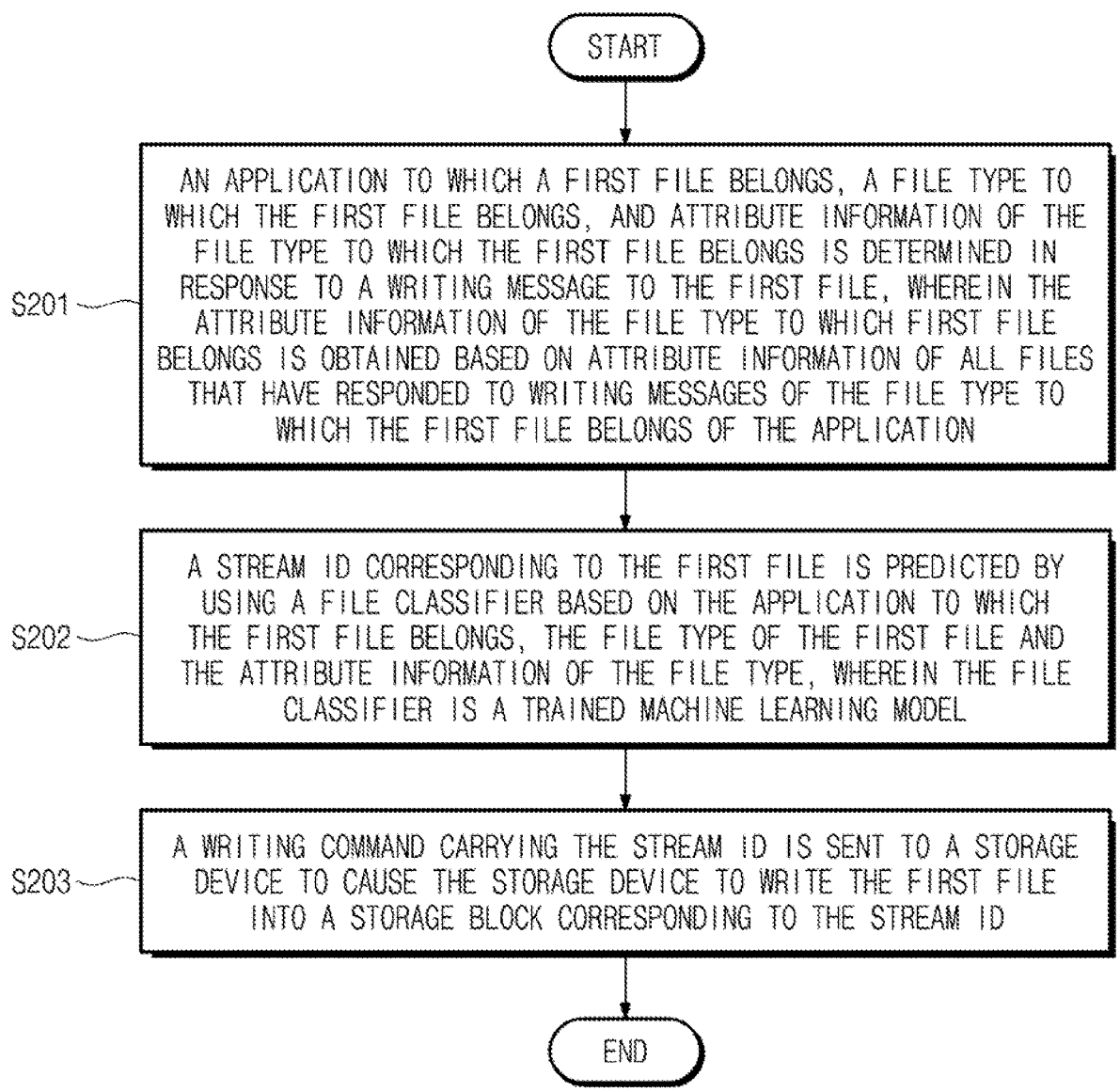
FIG. 2 illustrates a flowchart of a method for data storage according to an example embodiment of the disclosure.

FIG. 2 illustrates a flowchart of a method for data storage according to an example embodiment of the disclosure.

Referring to FIG. 2, in operation S201, based on a write message corresponding to the first file, determine an application to which a first file belongs, a file type to which the first file belongs, and attribute information of the file type to which the first file belongs. Here, the attribute information of the file type may be attribute information associated with the file type or attribute information corresponding to the file type. The attribute information of the file type to which first file belongs is obtained based on attribute information corresponding to all files of the file type on which write operation processing were performed based on respective a write message. According to an example embodiment, an application to which a first file belongs, a file type to which the first file belongs, and attribute information of the file type to which the first file belongs are determined in response to a write message corresponding to the first file.

According to an example embodiment, the write message corresponding to the first file may be a message, a command (i.e., a write command), a request, or an instruction indicating that the first file needs to be written to the storage device or a memory device. For example, when an application generates the first file whose file type is t that needs to be written to the storage device, the write message corresponding to the first file is generated accordingly, and the first file belongs to files of the file type t that have responded to write messages of the application. According to an example embodiment, all the files of the file type t that have responded to write commands of the application may be files that have been written to the storage device or the memory device. For example, all the files of the file type t that have responded to write commands of the application may be files on which write operations have be performed to store data of the respective files to the storage device or the memory device. Hereinafter, for the convenience of description, this type of a file is referred to as a writing file, correspondingly, a file that has been written to the storage device is called a written file.

For example, the write message corresponding to the first file may be a message delivered by the application to a file system, or may be a message delivered by the file system to a kernel, which is not specifically limited in this application.

As an example, the attribute information of a file may include one or more of a sync count, a sync page, a file size, a lifetime, and a total deleted file size and a file type, etc. of the file.

According to an example embodiment, the attribute information of the file may also include variations of the above attribute information, for example, sync page/file size, 1/lifetime and the like.

Accordingly, the attribute information of the file type to which the first file belongs may be understood as a collection of sub-attribute information of the file type. As mentioned above, the sub-attribute information of the file type to which the first file belongs may be one or more of a sync count, a sync page, a file size, a lifetime, a total deleted file size and a file type regarding files.

Of course, the sub-attribute information of the file type to which the first file belongs may also include one or more of variants of the above-mentioned sub-attribute information, for example, sync page/file size and 1/lifetime and the like.

For example, the attribute information of the file type t may be an average of the attribute information corresponding to all files of the file type t that have responded to write messages of the application A, and the attribute information of the file type t may also be obtained based on other calculation manner of the attribute information corresponding to all files of the file type t that have responded to write messages of the application A.

As an example, after receiving a write message corresponding to the first file, an application to which the first file belongs and the file type of the first file may be determined, and then the attribute information of the file type to which the first file belongs may be determined.

As an example, when a write message, which indicates that a file f whose file type is t from application A needs to be written to a storage device, is received, if the attribute information of file type t is not recorded, that is, the file type t of the application A is not monitored, the attribute information of the file type t may be initialized, and if the attribute information of the file type t has been recorded, the attribute information of the file type t is updated according to the recorded attribute information of the file type t and the attribute information of the file f. The initialized attribute information of file type t could be the attribute information of the file f and the updated attribute information of the file type t could be an average of attribute information corresponding to all files of file type t that have responded to write messages of application A.

As an example, the determined attribute information of the file type to which the first file belongs may be the initialized attribute information of the file type t, the updated attribute information of the file type t, or attribute information of the file type t that is recorded before updating.

As an example, at time T1, the application A generates a first file whose file type is t that needs to be written to a storage device, and the updated attribute information of the file type t is calculated as follows: if there are X files of the file type t that have responded to write messages before time T1, it is determined that all files of the file type t that have responded to the write messages of application A are the X files and the writing file generated at time T1 (i.e., X+1 files that have responded to the write messages). $\overline{synccount}$ that is an average of sync counts of the X+1 files is determined as a sync count of the file type t, $\overline{syncpage}$ that is an average of sync pages of the X+1 files is determined as a sync page of the file type t, $\overline{filesize}$ that is an average of file sizes of the X+1 files is determined as a file size of the file type t, $\overline{lifetime}$ that is an average of lifetimes of the X+1 files is determined as a lifetime of the file type t, and other attribute information of t (such as total deleted file size, etc. or a variation based on two attribute information (e.g., sync page/file size)) may be calculated in a similar way. For example, if the attribute information of a file of file type t is a ratio of the sync page to the file size and an reciprocal of the lifetime, then the corresponding attribute information of the file type t is an average of ratios of a sync page to a file size of the X+1 files, and an average of reciprocals of a lifetime of the X+1 files.

As an example, attribute information of a file type and a first number of all files of the file type that have responded to the write messages of an application may further be recorded, so as to update the attribute information of the file type.

As an example, if the attribute information of the file type t and the first number are not recorded before the write message corresponding to the first file is generated, the attribute information of the file type t may be initialized to be the attribute information of the first file, and the first number is recorded as 1. For example, a sync count and a sync page of the first file may be recorded as a sync count and a sync page of the file type t, respectively, and the first number may be recorded as 1. As another example, if the attribute information of the file type t and the first number have been recorded before the write message corresponding to the first file is generated, the attribute information of the file type t is updated according to the attribute information of the first file, the recorded attribute information of the file type t and the first number, and the first number is updated to be the original first number plus one. That is, the first number is incremented by one.

According to an example embodiment, for respective applications, attribute information of at least one file type of respective applications and the first numbers of the at least one file type are recorded respectively. For example, for application A, the attribute information of at least one file type and the first numbers corresponding to the at least one file type of application A are recorded; for application B, the attribute information of at least one file type and the first numbers corresponding to the at least one file type of application B are recorded.

As an example, after determining the application to which the first file belongs, the file type to which the first file belongs, and the attribute information of the file type to which the first file belongs, the method further include: if a period of time has not elapsed since the application was launched, the stream ID corresponding to the first file is determined according to a stream mapping table, based on the application to which the first file belongs and the file type to which the first file belongs. According to an example embodiment, the period of time may be a preset period of time. According to an example embodiment, the stream mapping table may be a preset stream mapping table. According to an example embodiment, the preset stream mapping table indicates a correspondence among applications, file types and stream IDs. As an example, the preset period of time may be preset by a user or set according to a preset rule.

As an example, refer to a preset stream mapping table shown by table 2, which shows a correspondence between different file types and stream IDs for respective applications.

TABLE 1

Stream Mapping Table

| Stream ID | App 1 | App 2 |
|---|---|---|
| Stream 0 | .xml | .db-wal |
|  | .db | .db |
| Stream 1 | .db-shm | .xml |
|  | .db-wal | .db-shm |
| ... | ... | ... |
|  | ... | ... |
| Stream N | .mp4 | .mp4 |
|  | .mov | .mov |

Referring to table 1, if running time of application (App) 1 does not exceed a preset time period and a writing file is generated, a stream ID may be allocated to the writing file according to a file type of the writing file. For example, if the writing file is a file whose type is .xml of App 1, Stream 0 is allocated to the writing file. Similarly, if running time of App 2 does not exceed the preset time period and a writing file whose type is .mp4 is generated, Stream N is allocated to the writing file.

As an example, the preset mapping relationship described above may be obtained as follows.

If an application (hereinafter, for the convenience of description, an application A is used as an example for description) generates files of Y file types during a test, attribute information of each of the Y file types is obtained, wherein the attribute information of each file type is obtained based on attribute information corresponding to all writing files of the each file type generated by the application A during the test. For example, the attribute information of the file type t may be an average of the attribute information corresponding to all write files of the file type t.

For example, for Y file types, the attribute information of each file type may be a set of M sub-attribute information, and clustering is performed on the same sub-attribute information of Y file types. Specifically, if sub-attribute information is a sync count, then clustering is performed on Y sync counts (i.e., the sub-attribute information of Y file types) corresponding to the Y file types to obtain category numbers corresponding to the sync counts of respective file types, wherein the number of category numbers is not greater than the number of stream IDs supported by the storage device. For example, by performing the clustering, it is determined that the sync count of the first file type corresponds to category 1, and the sync count of the second file type corresponds to category 3. Similarly, the clustering is performed on Y sync pages, for example, by performing the clustering, it is determined that the sync page of the first file type corresponds to category 2, and the sync page of the second file type corresponds to category 3, and other sub-attribute information of file types is clustered in a similar manner to determine a clustering category corresponding to each sub-attribute information of respective file types.

A stream ID corresponding to each file type is determined based on the clustering categories corresponding to respective sub-attribute information of the each file type. For example, an average of clustering category numbers corresponding to the respective sub-attribute information of the each file type may be used as the stream ID corresponding to the each file type (the specific calculation process will be described later).

Figure 3:
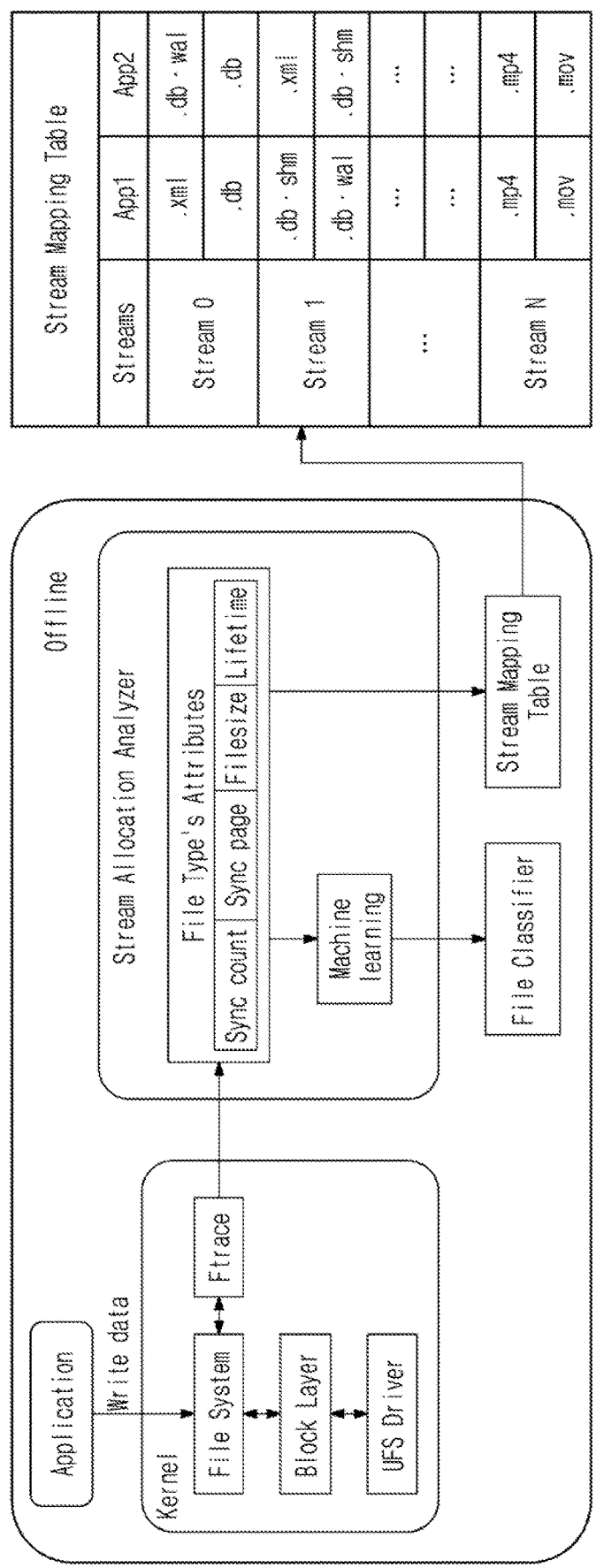
FIG. 3 illustrates a schematic diagram of an example method for determining a preset mapping relationship in an offline stage.

FIG. 3 illustrates a schematic diagram of an example method of determining the preset mapping relationship in an offline stage.

Referring to FIG. 3, a host (for example, a stream allocation analyzer running on the host side) may collect relevant attribute information of writing files generated by respective applications through a Ftrace program, and determine a corresponding relationship among applications, file types and stream IDs based on the collected attribute information, wherein the corresponding relationship may has a form as shown by table 1.

As an example, a stream mapping table reflecting the corresponding relationship may be obtained in the offline stage as follows.

First, an application under test is executed manually or by using a test program for a time period, and at the same time, the stream allocation analyzer is executed to continuously collect the relevant attribute information of the writing files of respective applications through the Ftrace, wherein the relevant attribute information include but not limited to a sync count, a sync page, a file size, a lifespan or lifetime of a file, and a file type, where the lifespan or lifetime of the file is obtained as deletion time of the file minus creation time of the file.

Then, after the attribute information of the write files is collected, for each application, categories of file types are counted, wherein the file types may be determined by a filename extension.

Next, the attribute information of respective file types is calculated. For example, for the file type t for the application A, if the attribute information of the file type t is calculated by using attribute information a of files, then an average of the attribute information a of all writing files of the file type t for the application A are calculated as the attribute information a of the file type t of the application A. For details, refer to the description about the attribute information of the file type above.

Finally, for each application, a stream is allocated for each file type based on expert knowledge.

For example, a stream ID corresponding to each file type can be determined for each application as follows:

① For application A, the sync page of each file type is divided by the file size of the each file type as a fragment that is attribute information of the file type.

② For Y file types, clustering is performed on sync counts, fragments and reciprocals of lifetime that are the attribute information of the file types using a clustering algorithm (for example, k-means), wherein the number of categories of the clustering is not greater than N that is the number of streams supported by the block storage device. For example, by performing the clustering on Y fragments corresponding to the Y file types, a clustering category corresponding to a fragment of each file type may be obtained. Similarly, a clustering category corresponding to the sync count of each file type and the reciprocal of the lifetime may be obtained. $C_t^{sync}$ is recorded as representing a clustering category of the sync count of the file type t, and $C_t^{frag}$ is recorded as representing a clustering category of the fragment of the file type t and $C_t^{life}$ is recorded as representing a clustering category of the reciprocal of the lifetime of the file type t.

③ A rounding down operation is perform on $$\frac{c_t^{sync} + c_t^{frag} + c_t^{life}}{3},$$

and the result of the operation is a stream ID (that is, the stream ID corresponding to the write file of file type t) corresponding to file type t. For example, if $C_t^{sync}$, $C_t^{frag}$, and $C_t^{life}$ are 1, 2, and 4 respectively, the result of the rounding down operation on 7/3 is 2, and the stream ID corresponding to file type t is stream 2. The disclosure is not limited thereto, and as such, according to another example embodiment, other operations may also be performed on $$\frac{c_t^{sync} + c_t^{frag} + c_t^{life}}{3}$$

to determine the stream ID corresponding to t, for example, the result of a rounding operation on $$\frac{c_t^{sync} + c_t^{frag} + c_t^{life}}{3}$$

is 3, then a corresponding stream 3 (that is, the stream ID corresponding to the writing file of the file type t) is allocated to t.

④ The mapping relationship between file types and stream IDs of application A is determined by the above method, and the mapping relationship between file types and stream IDs of other applications is determined in a similar manner to obtain the stream mapping table.

As described above, the mapping relationship among applications, file types and stream IDs may be obtained during the offline stage of applications. When a stream ID is allocated to a writing file by using the stream mapping table, a stream ID that matches the application to which the writing file belongs and the file type of the writing file is found from the stream mapping table, and the stream ID is a stream ID allocated to the writing file.

As an example, if a preset period of time has not elapsed since the application was launched, it is also possible to allocate a preset stream ID to a writing file without referring to the stream mapping table.

As an example, after a stream ID is allocated for a writing file according to the stream mapping table, the allocated stream ID can be transferred to a kernel through invoking a fcntl system.

Referring back to FIG. 2, in operation S202, a stream id corresponding to the first file is predicted by using a file classifier based on the application to which the first file belongs, the file type of the first file and the attribute information of the file type, wherein the file classifier is a trained machine learning model.

It should be noted that, after the application to which the first file belongs, the file type of the first file and the attribute information of the file type are determined, the file classifier may be used to predict the stream ID corresponding to the first file without considering the preset period of time.

Preferably, if the preset period of time has elapsed since the application was launched, the file classifier is used to predict the stream ID corresponding to the first file.

As an example, an input of the file classifier may be attribute information of the file type t, and an output is the stream ID corresponding to the writing file. That is, the trained machine learning model predicts the stream ID corresponding to the writing file based on the attribute information of the file type of the writing file.

As an example, the input of the file classifier may be the file type and the attribute information of the file type, and the output is the stream ID corresponding to the writing file. That is, the trained machine learning model predicts the stream ID corresponding to the writing file based on the file type of the writing file and the attribute information of the file type.

It should be noted that input parameters of the file classifier are related to the training data in a training stage of the file classifier. If input training data in the training stage of the file classifier is the attribute information of a file type, it only needs to input the attribute information of the file type in operation 202. Likewise, if the input training data in the training stage of the file classifier is a file type and the attribute information of the file type, it only needs to input the file type and the attribute information of the file type in operation 202.

Referring back to FIG. 3, attribute information of file types obtained during a test for an application may be utilized to obtain a trained machine learning model (e.g., the file classifier), in the offline stage.

According to an example embodiment, in order to train a machine learning model, a large amount of training data is required to train the machine learning model.

As an example, the training dataset used to obtain the file classifier is obtained as follows.

During a test for applications, attribute information corresponding to all files requested to be written of respective applications is obtained in each time period.

For each application, the attribute information of each file type in the each time period is calculated, and a stream ID corresponding to the each file type is determined based on the attribute information of respective file types, which has been described above in the description of determining the stream mapping table and is not repeated here.

The attribute information of the file types and stream IDs corresponding to the attribute information of the file types for the each time period are a set of training data for training the file classifier, and correspondingly, a plurality of time periods correspond to a plurality of sets of training data.

As an example, during the test for the applications, time periods may be divided according to the following rules: the time period between a first time and a second time is a first time period, the time period between the second time and a third time is a second time period, and the time period between the third time and a fourth time is a third time period, and so on.

As another example, during the test of the applications, the time periods may be divided according to the following rules: the time period between the first time and the second time is the first time period, the time period between the first time and the third time is the second time period, and the time period between the first time and the fourth time is the third time period, and so on.

The above manner of dividing the time periods is only an example, and as such, according to another example embodiment, the time periods may also be divided in other manners.

As an example, each of the above times may be times at which a writing file is generated during the test for the applications.

After the training of the file classifier is completed by using the training data, the trained file classifier may be used to determine a stream ID corresponding to a writing file. For example, when the first file whose file type is t that is to be written is generated, the attribute information of file types may be input into the file classifier to obtain a stream ID corresponding to the first file.

According to an example embodiment, various machine learning models, such as decision trees, convolutional neural network models, etc., may be trained by using the training data sets, and are trained to determine a stream ID corresponding to a writing file according to the attribute information of the file type of the writing file. Since training of a machine learning model based on training data sets is the prior art, it will not be repeated here.

According to an example embodiment, each application may correspond to its own stream mapping table and/or file classifier (that is, the stream mapping table and/or file classifier is determined for each application), or respective applications may share a stream mapping table and/or file classifier (that is, a stream mapping table is determined for different applications and/or a file classifier is trained for different applications together).

Figure 4:
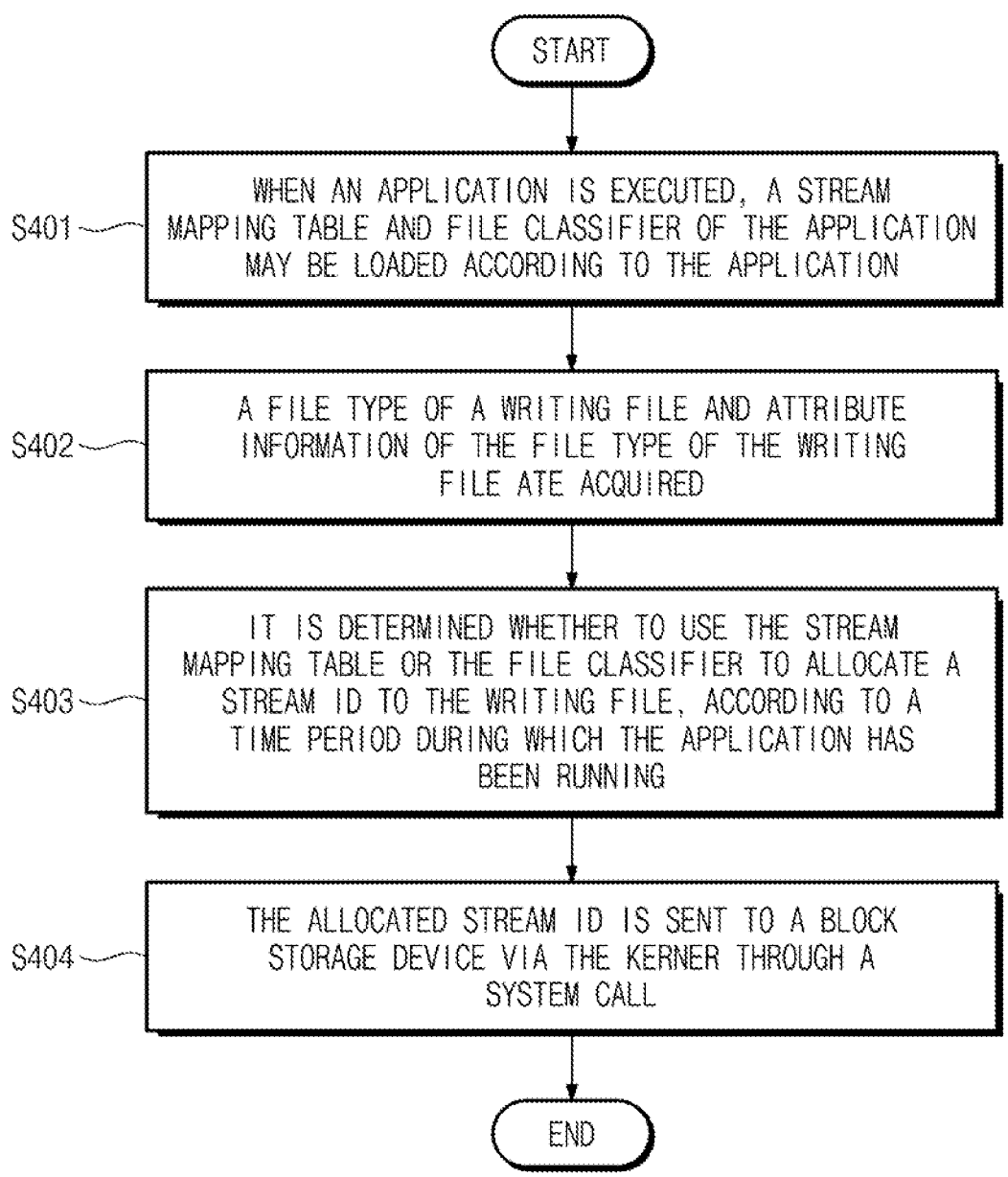
FIG. 4 illustrates a flowchart of an example of a method for data storage according to an example embodiment of the disclosure.

FIG. 4 illustrates a flowchart an example of a method for data storage according to an example embodiment of the disclosure.

Referring to FIG. 4, in operation S401, when an application is executed, a stream mapping table and file classifier of the application may be loaded according to the application.

In operation S402, a file type of a writing file and attribute information of the file type of the writing file are acquired.

In operation S403, it is determined whether to use the stream mapping table or the file classifier to allocate a stream id to the writing file, according to a time period during which the application has been running.

In operation S404, the allocated stream id is sent to a block storage device via the kernel through a system call.

Figure 5:
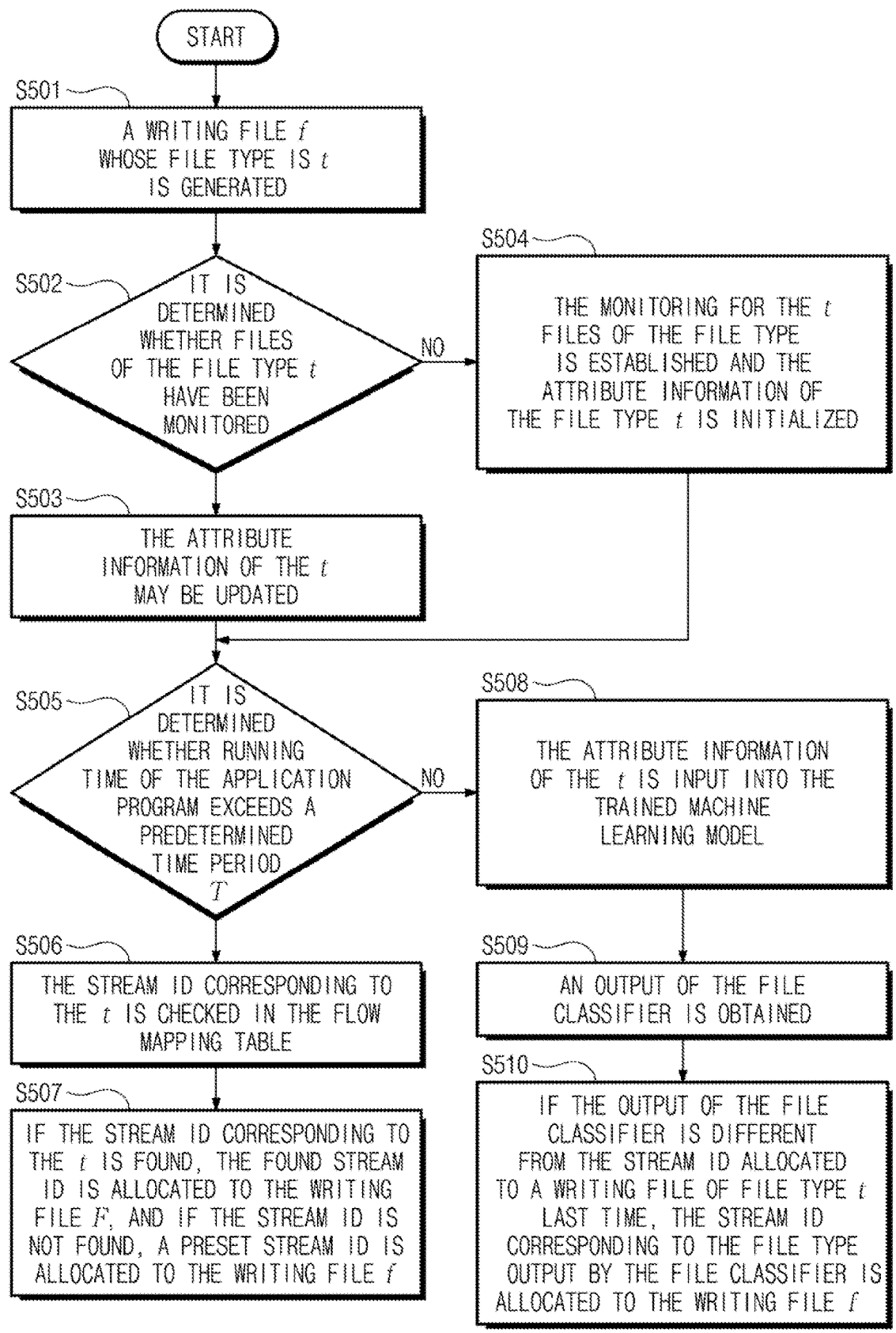
FIG. 5 illustrates a flowchart of another example of a method for data storage according to an example embodiment of the disclosure.

FIG. 5 illustrates a flowchart of another example of a method for data storage according to an example embodiment of the disclosure.

Referring to FIG. 5, in operation S501, a writing file f whose file type is t is generated.

In operation S502, it is determined whether files of the file type t have been monitored.

In operation S503, if yes, the attribute information of the t may be updated.

In operation S504, if no, the monitoring for the files of the file type t is established and the attribute information of the file type t is initialized.

In operation S505, it is determined whether running time of the application program exceeds a predetermined time period T.

In operation S506, if the running time does not exceed T, the stream id corresponding to the t is checked in the flow mapping table.

In operation S507, if the stream id corresponding to the t is found, the found stream id is allocated to the writing file f, and if the stream id is not found, a preset stream id is allocated to the writing file f.

In operation S508, if the running time exceeds T, the attribute information of the file type t is input into the trained machine learning model (e.g., the file classifier).

In operation S509, an output of the file classifier is obtained.

In operation S510, if the output of the file classifier is different from the stream id allocated to a writing file of file type t last time, the stream id corresponding to the file type t output by the file classifier is allocated to the writing file f.

Returning to FIG. 2, in operation S203, a writing command carrying the stream id is sent to a storage device to cause the storage device to write the first file into a storage block corresponding to the stream id.

In the methods illustrated according to one or more example embodiments of the disclosure, the stream IDs are automatically allocated to writing files based on a stream mapping table and a machine learning model. As such, codes of applications do not have to be modified and the methods of the disclosure applicable to any file system. Accordingly, the WAF of a block storage device may reduce and the lifespan of the block storage device may increase without significantly affecting user's experience.

The method for data storage according to an example embodiment of the disclosure is described above with reference to FIGS. 1-5. A device for data storage, a data storage system, and a data storage device according to embodiments of the disclosure will be described below with reference to FIGS. 6-10.

Figure 6:
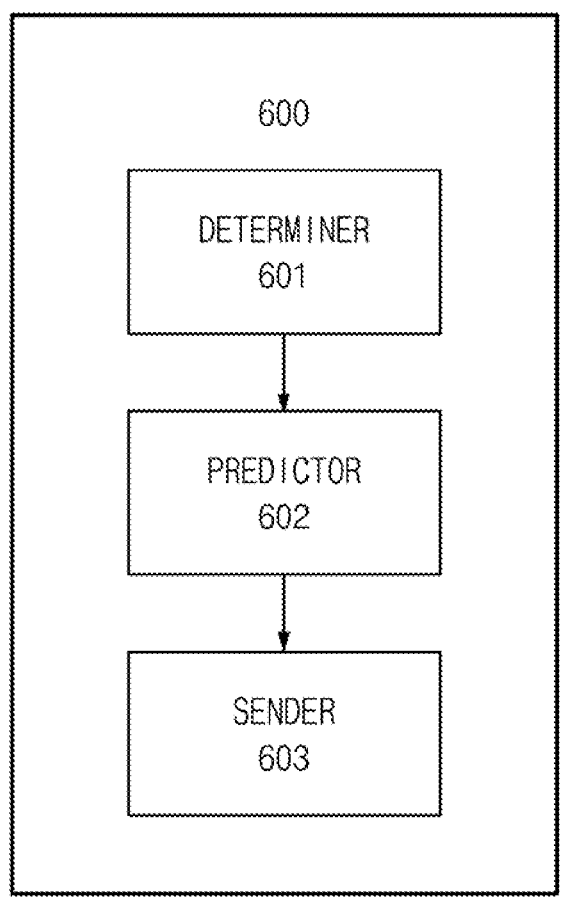
FIG. 6 is a block diagram illustrating a structure of a data storage device 600 for storing data according to an example embodiment of the disclosure.

FIG. 6 is a block diagram illustrating a structure of a data storage device 600 for storing data according to an example embodiment of the disclosure.

Referring to FIG. 0.6, the data storage device 600 may components including a determiner 601, a predictor 602 and a sender 603. According to an example embodiment, the data storage device 600 may additionally include other components, and at least one of components in the data storage device 600 may be divided or combined.

According to an example embodiment, some of the components of the data storage device 600 may be represented by functional block configurations and various processing operations. Some or all of the functional block configurations may be implemented by various pieces of hardware and/or software for performing certain functions. For example, functional blocks of the disclosure may be implemented by one or more microprocessors or may be implemented by circuit configurations for a certain function. In addition, for example, the functional blocks of the disclosure may be implemented in various programming or scripting languages. The functional blocks may be implemented by using an algorithm executed by one or more processors.

According to an example embodiment, the determiner 601 may be configured to determine an application to which a first file belongs, a file type to which the first file belongs, and attribute information of the file type to which the first file belongs in response to a write message corresponding to the first file, wherein the attribute information of the file type to which first file belongs is obtained based on attribute information corresponding to all files that have responded to write message corresponding the file type to which the first file belongs of the application.

According to an example embodiment, the predictor 602 may be configured to predict a stream ID corresponding to the first file by using a file classifier based on the application to which the first file belongs, the file type of the first file and the attribute information of the file type, wherein the file classifier is a trained machine learning model.

According to an example embodiment, the sender 603 may be configured to send a writing command carrying the stream ID to a storage device to cause the storage device to write the first file into a storage block corresponding to the stream ID.

According to an example embodiment, the data storage device 600 may further include a mapper configured to determine the stream ID corresponding to the first file according to a preset stream mapping table, based on the application to which the first file belongs and the file type to which the first file belongs if the preset period of time has not elapsed since the application was launched, wherein the preset stream mapping table indicates a correspondence among applications, file types and stream IDs.

According to an example embodiment, the data storage device 600 may further include a recorder configured to record the attribute information of the file type to which the first file belongs and a first number of all files of the file type that have responded to the write messages of the application.

According to an example embodiment, the recorder may be configured to update the attribute information of the file type to which the first file belongs and the first number according to attribute information of the first file, if the attribute information of the file type to which the first file belongs and the first number have been recorded, and record the attribute information of the first file as the attribute information of the file type to which the first file belongs, if the attribute information of the file type to which the first file belongs and the first number have not been recorded.

According to an example embodiment, the attribute information of the first file includes a sync count, a sync page, a file size and a lifetime of the first file, and the attribute information of the file type to which the first file belongs includes a sync count, a sync page, a file size and a lifetime of the file type to which the first file belongs.

According to an example embodiment, the sync count of the file type to which the first file belongs is an average of sync counts of all files of the file type to which the first file belongs that have responded to the write messages of the application, the sync page of the file type to which the first file belongs is an average of sync pages of all files of the file type to which the first file belongs that have responded to the write messages of the application, the file size of the file type to which the first file belongs is an average of file sizes of all files of the file type to which the first file belongs that have responded to the write messages of the application, and the lifetime of the file type to which the first file belongs is an average of lifetimes of all files of the file type to which the first file belongs that have responded to the write messages of the application.

Figure 7:
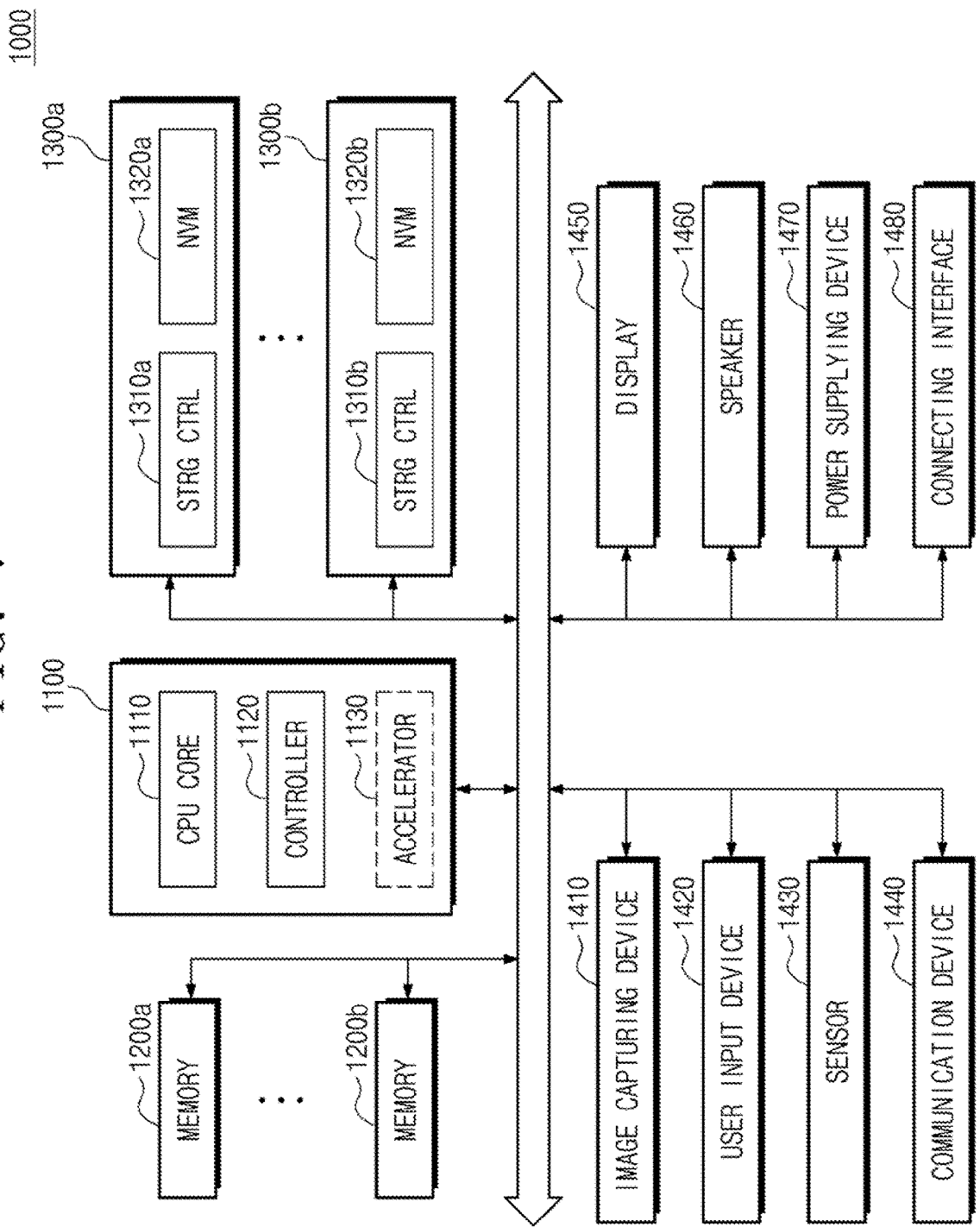
FIG. 7 is a schematic diagram of a system 1000 to which a storage device is applied, according to an example embodiment of the disclosure.

FIG. 7 is a schematic diagram of a system 1000 to which a storage device is applied according to an example embodiment of the disclosure.

The system 1000 of FIG. 7 may basically be a mobile system, such as a portable communication terminal (e.g., a mobile phone), a smartphone, a tablet personal computer (PC), a wearable device, a healthcare device, or an Internet of things (JOT) device. However, the system 1000 of FIG. 7 is not necessarily limited to the mobile system and may be a PC, a laptop computer, a server, a media player, or an automotive device (e.g., a navigation device).

Referring to FIG. 7, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some example embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to an example embodiment, the storage devices (e.g., 1300a and 1300b) may support a multi-stream storage mechanism.

As an example, there is provided a system to which a storage device is applied, including: a main processor (for example, 1100), a memory (for example, 1200a and 1200b); and storage devices (for example, 1300a and 1300b), wherein the memory stores computer program for the main processor to perform the method for the storage device as described above.

Figure 8:
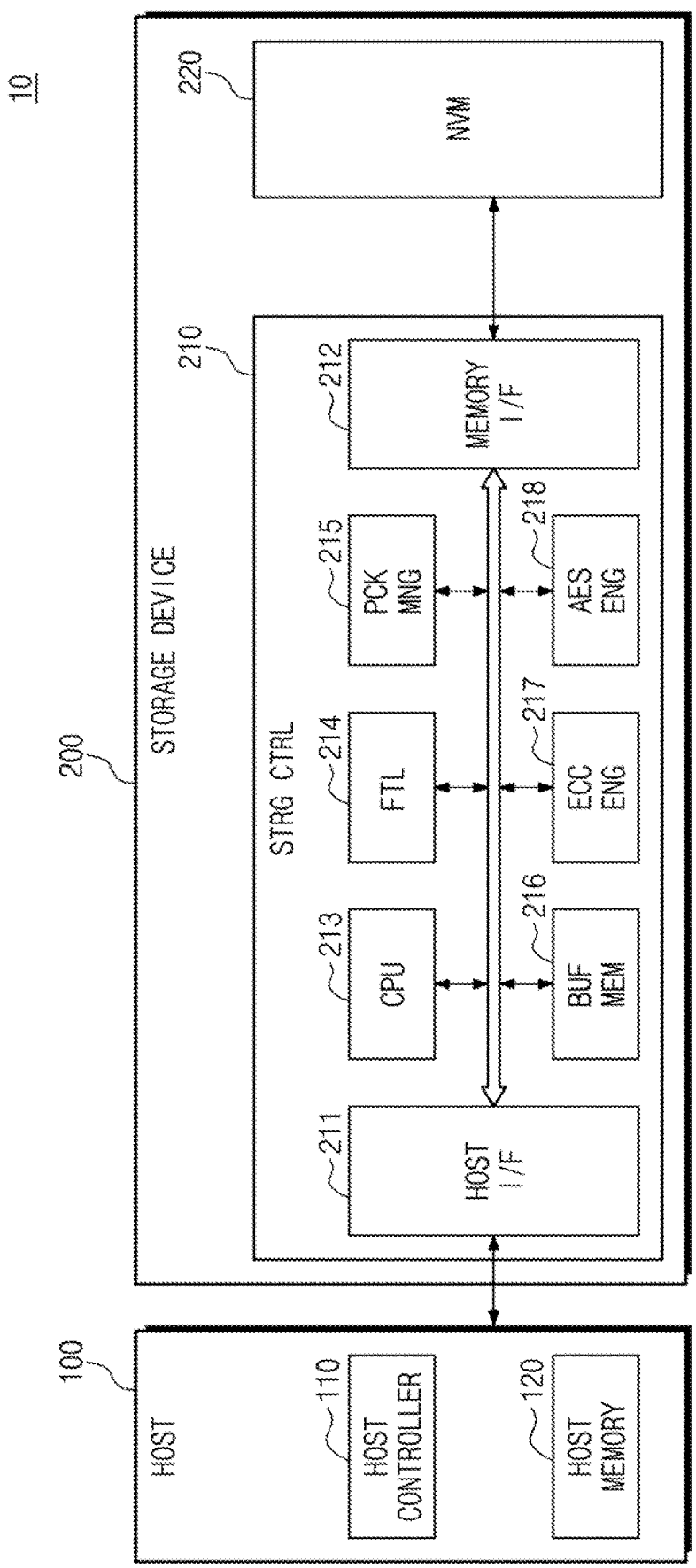
FIG. 8 is a block diagram of a host storage system 10 according to an example embodiment.

FIG. 8 is a block diagram of a host storage system 10 according to an example embodiment of the disclosure.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an example embodiment, the host controller 110 and the host memory 120 may be implemented as separate semiconductor chips. Alternatively, in some example embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to an example embodiment of the disclosure, a host storage system is provided, including: a host (for example, 100); and a storage device (for example, 200) supporting multi-streams, wherein the host memory is configured to perform the method for data storage as described above.

Figure 9:
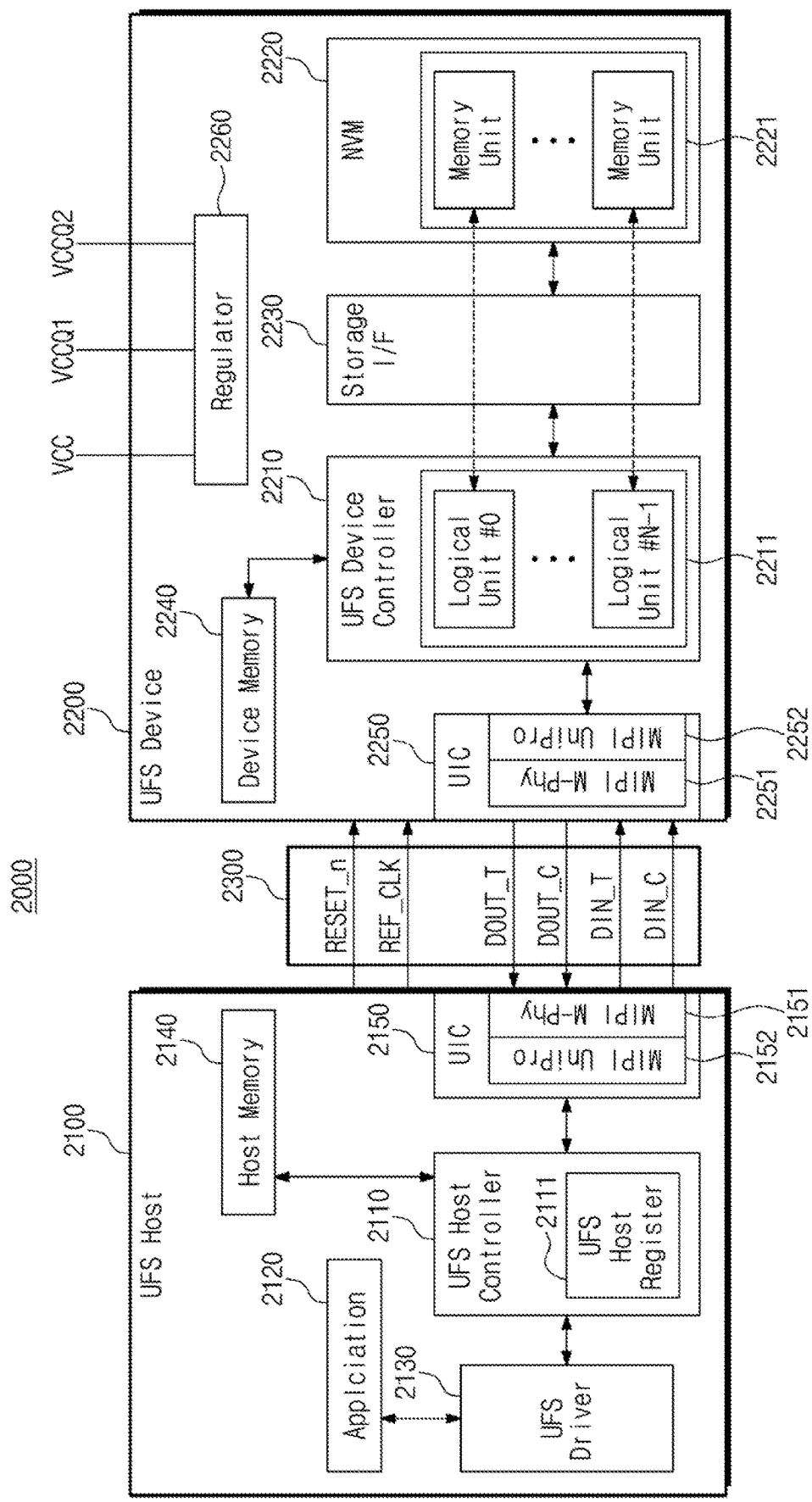
FIG. 9 is a block diagram of a UFS system 2000 according to an example embodiment.

FIG. 9 is a block diagram of a UFS system 2000 according to an example embodiment of the disclosure.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 7 may also be applied to the UFS system 2000 of FIG. 9 within a range that does not conflict with the following description of FIG. 9.

Referring to FIG. 9, the UFS host 2100 may be connected to the UFS device 2200 through the UFS interface 2300. When the main processor 1100 of FIG. 7 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 7. The UFS device 2200 may correspond to the storage device 1300a and 1300b of FIG. 7, and a UFS device controller 2210 and an NVM 2220 may respectively correspond to the storage controllers 1310a and 1310b and the NVMs 1320a and 1320b of FIG. 7.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 9, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 9, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to an example embodiment of the disclosure, a UFS system is provided, including: a UFS host (for example, 2100); a UFS device (for example, 2200); and a UFS interface (for example, 2300), used for a communication between the UFS device and the UFS host, the UFS host is configured to execute the method for data storage as described above.

Figure 10:
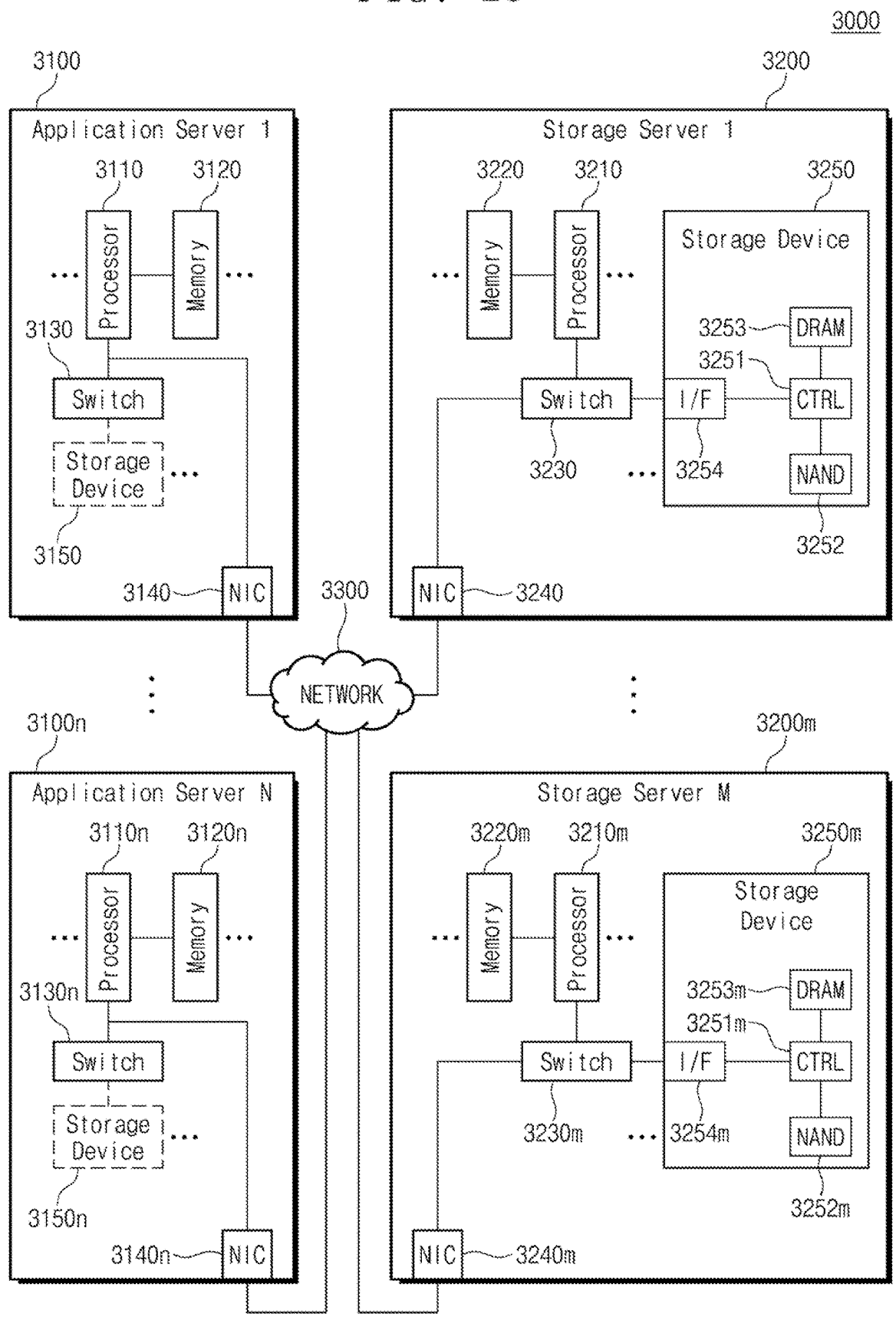
FIG. 10 is a diagram of a data center 3000 to which storage devices are applied according to an example embodiment.

FIG. 10 is a diagram of a data center 3000 to which a storage device is applied according to an example embodiment of the disclosure.

Platform Portion—Server (Application/Storage)

Referring to FIG. 10, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and memories 3220 included in the storage server 3200 may be variously selected. In an example embodiment, the processor 3210 and the memory 3220 may provide a processor-memory pair. In an example embodiment, the number of processors 3210 may be different from the number of memories 3220. The processor 3210 may include a single-core processor or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to embodiments.

Platform Portion—Network

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an example embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300.

Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

Organic Relationship—Interface Structure/Type

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the MC (Network InterConnect) 3240. The switch 3230 may selectively connect the processor 3210 to the storage device 3250 or selectively connect the NIC 3240 to the storage device 3250 via the control of the processor 3210.

In an example embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an example embodiment, the NIC 3240 may be integrated with at least one of the processor 3210, the switch 3230, and the storage device 3250.

Organic Relationship—Interface operation In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation

The controller 3251 may control all operations of the storage device 3250. In an example embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

According to an example embodiment of the disclosure, a data center system (for example, 3000) is provided, including: a plurality of application servers (for example, 3100-3100n); and a plurality of storage servers (for example, 3200-3200m), wherein each storage server includes a storage device, and at least one of the plurality of application servers and the plurality of storage servers is configured to perform the method for data storage as described above.

According to an example embodiment of the disclosure, there is provided a computer-readable storage medium storing a computer program, when executed by a processor, implementing the method for data storage as described above.

According to an example embodiment of the disclosure, there is provided an electronic apparatus, including: a processor; and a memory storing a computer program, when executed by the processor, implementing the method for data storage as described above.

According to an example embodiment of the disclosure, there may also be provided a computer-readable storage medium storing instructions, when executed by at least one processor, causing the at least one processor to execute the method for data storage according to the disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

Those skilled in the art related to the embodiments will understand that the embodiments may be implemented in a modified form without departing from the essential characteristics of the above description. Therefore, the disclosed embodiments have to be considered in an illustrative sense rather than a restrictive sense. The scope of rights is represented in the claims rather than the above description, and all differences within the scope equivalent thereto should be construed as included in the embodiment.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method for data storage, comprising:
determining, based on a write message corresponding to a first file, an application corresponding to the first file, a file type of the first file, and first attribute information corresponding to the file type, the first attribute information corresponding to the file type obtained based on second attribute information corresponding to all files of the file type on which the write operation processing have been performed in response to the respective write messages of the application;
predicting a stream identification information corresponding to the first file by using a file classifier based on the application corresponding to the first file, the file type of the first file and the first attribute information corresponding to the file type, the file classifier being a trained machine learning model; and
sending a writing command carrying the stream identification information to a storage device to cause the storage device to write the first file into a storage block corresponding to the stream identification information.

2. The method of claim 1,
wherein the stream identification information corresponding to the first file using the file classifier is predicted based on whether a first period of time has elapsed from a time of launch of the application.

3. The method of claim 2,
wherein, based on a determination that the first period of time has not elapsed since the time of launch of the application, determining the stream identification information corresponding to the first file according to a stream mapping table, based on the application corresponding to the first file and the file type of the first file, and
wherein the stream mapping table indicates a correspondence between a plurality of applications, a plurality of file types and a plurality of stream identification information.

4. The method of claim 1, further comprises:
recording the first attribute information corresponding to the file type and a first number of all files of the file type on which the write operation processing have been performed in response to the respective write messages of the application.

5. The method of claim 4, wherein the obtaining the first attribute information of the file type comprises:
based on the first attribute information corresponding to the file type and the first number being recorded, updating the first attribute information corresponding to the file type and the first number according to third attribute information corresponding to the first file; and
based on the first attribute information corresponding to the file type and the first number not being recorded, recording the third attribute information corresponding to the first file as the first attribute information corresponding to the file type.

6. The method of claim 5, wherein the third attribute information corresponding to the first file comprises a first sync count, a first sync page, a first file size and a first lifetime of the first file; and
wherein the first attribute information corresponding to the file type comprises a second sync count, a second sync page, a second file size and a second lifetime of the file type.

7. The method of claim 6, wherein the second sync count of the file type is an average of sync counts of all files of the file type on which the write operation processing have been performed in response to the respective write messages of the application,
wherein the second sync page of the file type is an average of sync pages of all files of the file type on which the write operation processing have been performed in response to the respective write messages of the application,
wherein the second file size of the file type is an average of file sizes of all files of the file type on which the write operation processing have been performed in response to the respective write messages of the application, and
wherein the second lifetime of the file type is an average of lifetimes of all files of the file type on which the write operation processing have been performed in response to the respective write messages of the application.

8. A data storage device, comprising:
a memory configured to store one or more instructions; and
a processor configured to execute the one or more instructions to:
determine, based on a write message corresponding to a first file, an application corresponding to the first file, a file type of the first file, and first attribute information corresponding to the file type, the first attribute information corresponding to the file type being obtained based on second attribute information corresponding to all files of the file type on which the write operation processing have been performed in response to the respective write message of the application;

predict a stream identification information corresponding to the first file by using a file classifier based on the application corresponding to the first file, the file type of the first file and the first attribute information corresponding to the file type, the file classifier being a trained machine learning model; and send a writing command carrying the stream identification information to a storage device to cause the storage device to write the first file into a storage block corresponding to the stream identification information.

9. The data storage device of claim 8, wherein the stream identification information corresponding to the first file using the file classifier is predicted based on whether a first period of time has elapsed from a time of launch of the application.

10. The data storage device of claim 9, wherein the processor is further configured to, based on a determination that the first period of time has not elapsed since the time of launch of the application, determine the stream identification information corresponding to the first file according to a stream mapping table, based on the application corresponding to the first file and the file type of the first file, and wherein the stream mapping table indicates a correspondence between a plurality of applications, a plurality of file types and a plurality of stream identification information.

11. The data storage device of claim 8, wherein the processor is further configured to execute the instruction to record the first attribute information corresponding to the file type and a first number of all files of the file type on which the write operation processing have been performed in response to the respective write messages of the application.

12. The data storage device of claim 11, wherein to obtain the first attribute information of the file type, the processor is configured to:

based on the first attribute information corresponding to the file type and the first number being recorded, update the first attribute information corresponding to the file type and the first number according to third attribute information corresponding to the first file; and based on the first attribute information corresponding to the file type and the first number not being recorded, record the third attribute information corresponding to the first file as the first attribute information corresponding to the file type.

13. The data storage device of claim 12, wherein the third attribute information corresponding to the first file comprises a first sync count, a first sync page, a first file size and a first lifetime of the first file; and wherein the first attribute information corresponding to the file type comprises a second sync count, a second sync page, a second file size and a second lifetime of the file type.

14. The data storage device of claim 13, wherein the second sync count of the file type is an average of sync counts of all files of the file type on which the write operation processing have been performed in response to the respective write messages of the application, wherein the second sync page of the file type is an average of sync pages of all files of the file type on which the write operation processing have been performed in response to the respective write messages of the application, wherein the second file size of the file type is an average of file sizes of all files of the file type on which the write operation processing have been performed in response to the respective write messages of the application, and wherein the second lifetime of the file type is an average of lifetimes of all files of the file type on which the write operation processing have been performed in response to the respective write messages of the application.

15. A system to which a storage device is applied, comprising:

a main processor;

a memory; and a storage device, wherein the memory is configured to store one or more instructions; and wherein in the main processor is configured to execute the one or more instructions to:

determine, based on a write message corresponding to a first file, an application corresponding to the first file, a file type of the first file, and first attribute information corresponding to the file type, the first attribute information corresponding to the file type being obtained based on second attribute information corresponding to all files of the file type on which the write operation processing have been performed in response to the respective write messages of the application;

predict a stream identification information corresponding to the first file by using a file classifier based on the application corresponding to the first file, the file type of the first file and the first attribute information corresponding to the file type, the file classifier being a trained machine learning model; and send a writing command carrying the stream identification information to the storage device to cause the storage device to write the first file into a storage block corresponding to the stream identification information.

16. The system of claim 15, wherein the stream identification information corresponding to the first file using the file classifier is predicted based on whether a first period of time has elapsed from a time of launch of the application.

17. The system of claim 16, wherein the main processor is further configured to, based on a determination that the first period of time has not elapsed since the time of launch of the application, determine the stream identification information corresponding to the first file according to a stream mapping table, based on the application corresponding to the first file and the file type of the first file, and wherein the stream mapping table indicates a correspondence between a plurality of applications, a plurality of file types and a plurality of stream identification information.

18. The system of claim 15, wherein the main processor is further configured to execute the instruction to record the first attribute information corresponding to the file type and a first number of all files of the file type on which the write operation processing have been performed in response to the respective write messages of the application.

19. The system of 18, wherein to obtain the first attribute information of the file type, the main processor is configured to:

based on the first attribute information corresponding to the file type and the first number being recorded, update the first attribute information corresponding to the file type and the first number according to third attribute information corresponding to the first file; and based on the first attribute information corresponding to the file type and the first number not being recorded, record the third attribute information corresponding to the first file as the first attribute information corresponding to the file type.

20. The system of claim 19, wherein the third attribute information corresponding to the first file comprises a first sync count, a first sync page, a first file size and a first lifetime of the first file; and wherein the first attribute information corresponding to the file type comprises a second sync count, a second sync page, a second file size and a second lifetime of the file type, wherein the second sync count of the file type is an average of sync counts of all files of the file type on which the write operation processing have been performed in response to the respective write messages of the application, wherein the second sync page of the file type is an average of sync pages of all files of the file type on which the write operation processing have been performed in response to the respective write messages of the application, wherein the second file size of the file type is an average of file sizes of all files of the file type on which the write operation processing have been performed in response to the respective write messages of the application, and wherein the second lifetime of the file type is an average of lifetimes of all files of the file type on which the write operation processing have been performed in response to the respective write messages of the application.

* * * * *